(12) United States Patent  
Peters et al.

(10) Patent No.: US 8,039,996 B2  
(45) Date of Patent: Oct. 18, 2011

(54) ELECTRICALLY RESPONSIVE INK AND COATING COMPOSITIONS AND METHODS FOR ACTIVATION

(75) Inventors: Andrea Jeannine Peters, Clifton Park, NY (US); Marc Brian Wisnudel, Clifton Park, NY (US); Ben Purushotam Patel, Niskayuna, NY (US); Matthew Jeremiah Misner, Scotia, NY (US); James Mitchell White, Niskayuna, NY (US); Kasiraman Krishnan, Clifton Park, NY (US); Kaustubh Ravindra Nagarkar, Guilderland, NY (US)

(73) Assignee: NBCUniversal Media, LLC, Wilmington, DE (US)

( * ) Notice: Subject to any disclaimer, the term of this patent is extended or adjusted under 35 U.S.C. 154(b) by 398 days.

(21) Appl. No.: 11/864,501

(22) Filed: Sep. 28, 2007

(65) Prior Publication Data

US 2008/0012430 A1    Jan. 17, 2008

Related U.S. Application Data

(63) Continuation-in-part of application No. 11/286,413, filed on Nov. 21, 2005.

(51) Int. Cl.  
*C09D 11/02* (2006.01)  
*B32B 3/02* (2006.01)  
*H01H 36/00* (2006.01)

(52) U.S. Cl. .................. 307/131; 106/31.92; 428/64.2; 428/64.4; 524/561

(58) Field of Classification Search ............... 307/131; 106/31.92; 428/64.2, 64.4; 524/561  
See application file for complete search history.

(56) References Cited

U.S. PATENT DOCUMENTS

| 4,309,255 A | 1/1982 | Gendler et al. |
| 4,374,001 A | 2/1983 | Bernier |

(Continued)

FOREIGN PATENT DOCUMENTS

WO    98/40930 A1    9/1998

(Continued)

OTHER PUBLICATIONS

Kerr, J.B., "Polymer Electrolytes: an overview", Chapter IV-2, 2004, pp. 1-41.

(Continued)

*Primary Examiner* — Michael M Bernshteyn  
(74) *Attorney, Agent, or Firm* — Fletcher Yoder

(57) ABSTRACT

An electrically responsive ink composition comprising at least one electrically responsive optical-state change material, at least one electrolyte material, at least one solvent, and at least one binder material, wherein the ink composition has a viscosity between about 0.1 centipoise and about 10,000 centipoise, and a maximum optical absorbance in a range from about 200 nanometers to about 800 nanometers; and wherein the ink composition is capable of transforming from a first optical state to a second optical state upon exposure to an electrical stimulus. The electrically responsive ink composition may be used to deposit an electrically responsive coating composition, which may be used as part of an anti-theft system for optical articles. Articles comprising electrically responsive coating compositions are also disclosed, as are methods for activation.

15 Claims, 1 Drawing Sheet

U.S. PATENT DOCUMENTS

| | | | |
|---|---|---|---|
| 4,439,280 A | | 3/1984 | Gendler et al. |
| 4,443,302 A | | 4/1984 | Gendler et al. |
| 4,444,626 A | | 4/1984 | Bernier et al. |
| 4,478,687 A | | 10/1984 | Gendler et al. |
| 5,141,622 A | * | 8/1992 | Fauteux et al. ............... 205/55 |
| 5,491,262 A | | 2/1996 | Hung |
| 6,795,464 B2 | | 9/2004 | Lawandy |
| 7,227,445 B2 | | 6/2007 | Atkinson |
| 2002/0163479 A1 | | 11/2002 | Lin et al. |
| 2003/0198892 A1 | * | 10/2003 | Ezbiansky et al. ....... 430/270.14 |
| 2004/0022542 A1 | | 2/2004 | Atkinson |
| 2004/0054594 A1 | | 3/2004 | Forster et al. |
| 2005/0053865 A1 | * | 3/2005 | Wisnudel et al. ........ 430/270.15 |
| 2005/0110978 A1 | | 5/2005 | Potyrailo et al. |
| 2005/0167510 A1 | | 8/2005 | Potyrailo et al. |
| 2006/0028924 A1 | | 2/2006 | Atkinson |
| 2006/0234003 A1 | | 10/2006 | Selinfreund |
| 2007/0070867 A1 | | 3/2007 | Forster et al. |

FOREIGN PATENT DOCUMENTS

| | | |
|---|---|---|
| WO | 2004/095447 A1 | 11/2004 |
| WO | 2007/016430 A2 | 2/2007 |
| WO | 2007/016546 A2 | 9/2007 |

OTHER PUBLICATIONS

Isaksson, J., "Electrochemical Switching of Color and Wettability in Conjugated Polymer Devices", Linkopings Universitet, 2005, pp. 1-53.

Barthélémy Nyasse, Leif Grehn, Ulf Ragnarsson, Hernani L. S. Maia, Luis S. Monteiro, Ivo Leito, Ilmar Koppel, Juta Koppel, "Synthesis and cathodic cleavage of a set of substituted benzenesulfonamides including the corresponding tert-butyl sulfonylcarbamates: pKa of sulfonamides"; J. Chem. Soc., Perkin Trans. 1, 1995, (16),2025-2031.

* cited by examiner

ELECTRICALLY RESPONSIVE INK AND COATING COMPOSITIONS AND METHODS FOR ACTIVATION

The present patent application is a continuation-in-part application from U.S. patent application Ser. No. 11/286,413, filed Nov. 21, 2005, the disclosure of which is hereby incorporated by reference in its entirety.

BACKGROUND

The invention includes embodiments that relate to an electrically responsive ink composition and an electrically responsive coating composition. More particularly, the invention includes embodiments that relate to an electrically responsive ink composition and an electrically responsive coating composition for use as part of an anti-theft system for optical articles. Furthermore, articles comprising an electrically responsive coating composition, and methods for activation of the electrically responsive coating composition are also disclosed.

Shoplifting is a major problem for retail venues and especially for shopping malls, where it is relatively difficult to keep an eye on each customer while they shop or move around in the store. Relatively small objects, such as CDs and DVDs are common targets as they can be easily hidden and carried out of the shops without being noticed. Shops, as well as the entertainment industry, incur monetary losses because of such instances.

Even though closed circuit surveillance cameras may be located at such places, theft still occurs. Retail products sometimes are equipped with theft-deterrent packaging. For example, clothing, CDs, audiotapes, DVDs and other high-value items are occasionally packaged along with tags that set off an alarm if the item is removed from the store without being purchased. These tags are engineered to detect and alert for shoplifting. For example, tags that are commonly used to secure against shoplifting are the Sensormatic® electronic article surveillance (EAS) tags based on acousto-magnetic technology. RFID tags are also employed to trace the items on store shelves and warehouses. Other theft-deterrent technologies currently used for optical discs include hub caps for DVD cases that lock down the disc and prevent it from being removed from the packaging until it is purchased, and "keepers" that attach to the outside of the DVD case packaging to prevent the opening of the package until it is purchased. In some cases, retailers have resorted to storing merchandise in locked glass display cases. In other stores, the DVD cases on the shelves are empty, and the buyer receives the actual disc only when purchased. Many of these approaches are unappealing because they add an additional inconvenience to the buyer or retailer, or they are not as effective at preventing theft as desired. Optical storage media, in particular, pose an additional problem in that their packaging and the sensor/anti-theft tags may be easily removed.

Therefore, there is a continued need to provide techniques and systems that can assist in reducing the incidence of, and damage caused by, stolen media.

BRIEF DESCRIPTION

Figure 1:
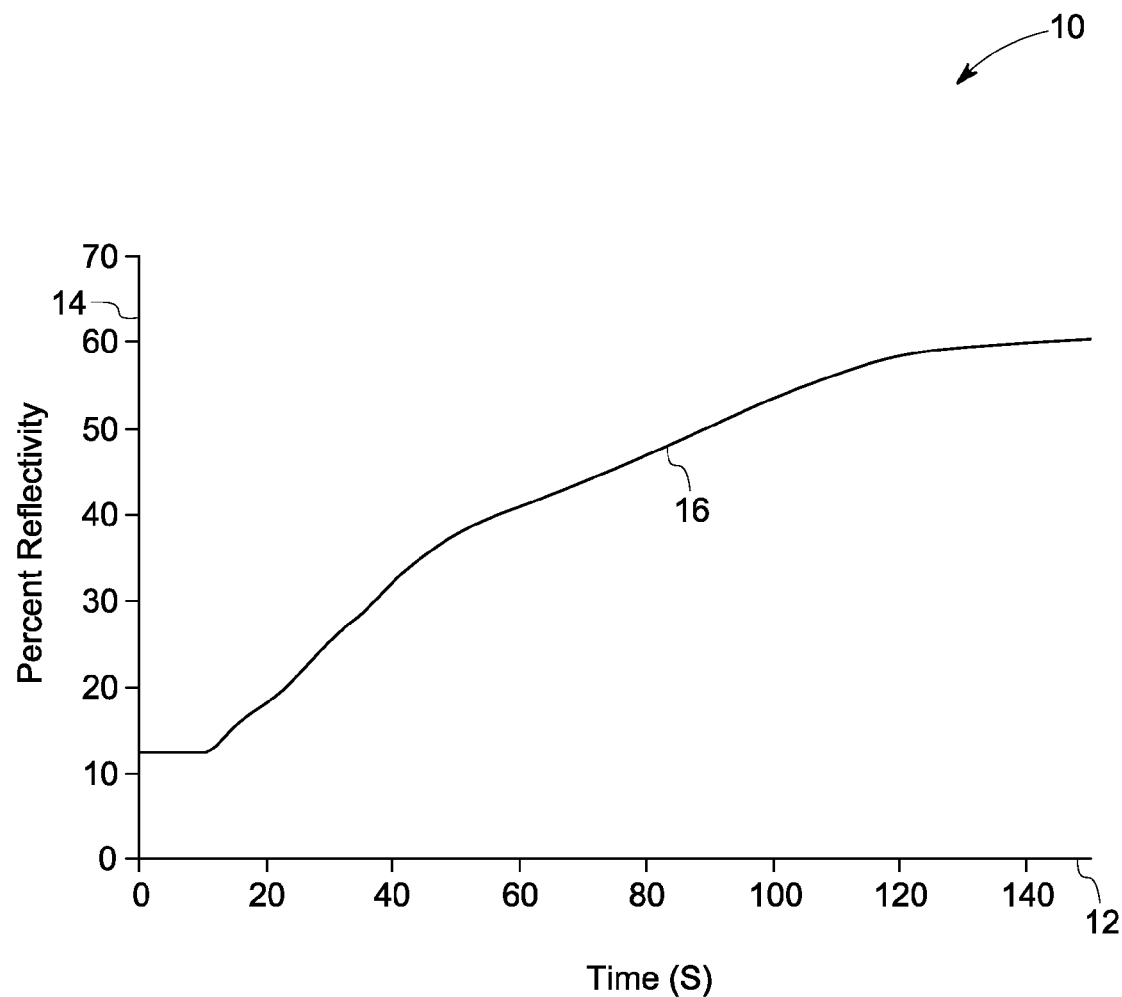
FIG. 1 shows the change in reflectivity of an electrically responsive coating composition with time according to an embodiment described herein.

One embodiment of the present disclosure is directed to an electrically responsive ink composition comprising—at least one electrically responsive optical-state change material, at least one electrolyte material, at least one solvent, and at least one binder material, wherein the ink composition has a viscosity between about 0.1 centipoise (cPs) and about 10,000 centipoise, and a maximum optical absorbance in a range from about 200 nanometers (nm) to about 800 nm, and wherein the ink composition is capable of transforming from a first optical state to a second optical state upon exposure to an electrical stimulus.

Another embodiment of the present disclosure is directed to an electrically responsive coating composition comprising at least one electrically responsive optical-state change material, at least one electrolyte material, and at least one binder material, wherein the coating composition is essentially free of solvent and has a maximum optical absorbance in a range from about 200 nm to about 800 nm, and wherein the coating composition is capable of transforming from a first optical state to a second optical state upon exposure to an electrical stimulus.

Another embodiment of the present disclosure is directed to an article comprising an electrically responsive coating composition deposited in or deposited on the article, wherein the electrically responsive coating composition comprises at least one electrically responsive optical-state change material, at least one electrolyte, and at least one binder material, wherein the electrically responsive coating composition is essentially free of solvent, and wherein the electrically responsive coating composition has a maximum optical absorbance in a range from about 200 nm to about 800 nm, and wherein the electrically responsive coating is capable of transforming from a first optical state to a second optical state upon exposure to an electrical stimulus.

These and other advantages and features will be more readily understood from the following detailed description of preferred embodiments of the invention that is provided in connection with the accompanying drawing.

DETAILED DESCRIPTION

One solution to the shoplifting problem, specifically for optical media articles such as DVD's, is to render at least a portion of the content of the DVD inaccessible unless the retailer at the point-of-sale has activated the DVD. One approach to rendering the content of the DVD inaccessible prior to activation is to employ an electrically responsive ink composition to deposit an electrically responsive coating composition in or on the DVD, wherein the electrically responsive coating composition at least partially absorbs the incident laser light from an optical data reader so that the complete data directly in the optical path of the laser light cannot be read. In this instance, the optical article has no value, and therefore there is no incentive for the shoplifter to steal it. However, upon converting the DVD to an "activated" state using an external stimulus at the point-of-sale, the electrically responsive coating composition becomes sufficiently transparent, with respect to the wavelength of the laser light employed in the optical data reader, due to a change in the optical properties of the electrically responsive coating composition, and the complete data directly in the optical path of the laser light can now be read by the incident laser light from the optical data reader, therefore rendering the full content of the DVD accessible to a legitimate consumer.

Various embodiments of electrically responsive ink compositions, electrically responsive coating compositions, articles comprising electrically responsive coating compositions, and methods for activating the electrically responsive coating compositions are described below. Aspects of the embodiments described herein can be used in combination with the materials, systems and techniques previously disclosed in U.S. patent application Ser. No. 11/538,451 and Ser. No. 11/567,271, to inhibit the theft or unauthorized use of optical articles. Thus the disclosures of U.S. patent application Ser. No. 11/538,451, filed Oct. 4, 2006, and U.S. patent application Ser. No. 11/567,271, filed Dec. 6, 2006, are both hereby incorporated by reference in their entireties. Aspects of the embodiments described herein can be used in combination with the materials, systems and techniques disclosed in titled: OPTICAL ARTICLE HAVING AN ELECTRICALLY RESPONSIVE LAYER AS AN ANTI-THEFT FEATURE AND A SYSTEM AND METHOD FOR INHIBITING THEFT and 220807-2 titled: OPTICAL ARTICLE HAVING AN ELECTRICALLY RESPONSIVE LAYER AS AN ANTI-THEFT FEATURE AND A SYSTEM AND METHOD FOR INHIBITING THEFT filed Herewith which is co-pending with the present disclosure, and is hereby incorporated by reference in its entirety.

In one embodiment, an electrically responsive ink composition comprises at least one electrically responsive optical-state change material, at least one electrolyte material, at least one solvent, and at least one binder material, wherein the composition has a viscosity between about 0.1 cPs and about 10,000 cPs, and a maximum optical absorbance in a range from about 200 nm to about 800 nm, and wherein the electrically responsive ink composition is capable of transforming from a first optical state to a second optical state upon exposure to a stimulus.

The term "electrically responsive" as used herein, describes materials that undergo either a reversible or an irreversible electrically induced change, for example a change in color or other optical properties. As used herein the term "optical-state change" material is used to describe a material which is capable of existing in at least two different forms, each form possessing a unique optical state, for example a unique wavelength associated with a maximum optical absorbance within a range from about 200 nm to about 800 nm, a unique amount of absorbance at a particular wavelength within a range from about 200 nm to about 800 nm, or a unique extinction coefficient at a specific wavelength between about 200 nm to about 800 nm. Non-limiting examples of electrically responsive optical-state change materials include halochromic optical-state change materials, electrically responsive polymeric materials, electrically responsive organic compounds, electrically responsive hydrogels, liquid crystalline materials, leuco dyes, inorganic compounds such as, but not limited to, metal oxides and organometallic compounds, materials capable of undergoing an electrically initiated sigmatropic bond rearrangement, and electrically reactive adduct materials.

One suitable halochromic optical-state change material that may be used in the electrically responsive ink composition is a chromic dye. As described herien the term "halochromic" describes a material which changes optical state for example, color, upon a change in pH, i.e., a change in the acidity or basicity results in a change in the optical absorbance of the chromic dye. This process is also known as "acidichromism" or "halochromism". For example, the electrically responsive ink composition may contain a dye i.e., a pH responsive dye such as for example a triarylmethylene dye. One example of a triarylmethylene dye is the sodium salt of bromocresol green, which undergoes a change in its maximum optical absorbance from about 600 nm to about 650 nm at a pH value greater than about 7 to an optical absorbance below 450 nm at a pH values less than about 5. Within the scope of this disclosure the terms "pH" or "change in pH" are used to describe the acidity, basicity, or change in acidity or basicity of the electrically responsive ink composition or electrically responsive coating. A decrease in the pH is a result of an increase in acidity (or decrease in basicity) and an increase in the pH is a result of a decrease in acidity (or increase in basicity). In aqueous systems, pH values less than 7 are classified as acidic and pH values greater than 7 are classified as basic.

As used herein, the term "chromic dye" describes optical-state change dyes which can exist in two different color forms between about 200 nm to about 800 nm. In one embodiment, the chromic dye is a triarylmethylene dye. Suitable non-limiting examples of triarylmethylene dyes include bromocresol green, bromocresol purple, methyl green, cationic cyanine dyes, and corresponding salts thereof. Suitable examples of other chromic dyes are included in the listing of dyes below.

In another embodiment, the electrically responsive material may contain an electropolymerizable monomer. For example, the electrically responsive material may contain an electropolymerizable monomer such as a thiophene, with a maximum optical absorbance of less than 300 nm, which can undergo an electrochemical oxidation reaction to produce a polythiophene polymer, with a maximum optical absorbance of greater than 500 nm.

Suitable electrically responsive polymeric materials that may be used in the electrically responsive ink composition include non-crosslinkable and crosslinkable homopolymers and copolymers doped with commercially available dyes commonly known to those skilled in the art. Suitable non-limiting examples of polymeric materials include polyolefins, polyesters, polyamides, polyacrylates, polymethacrylates, polyvinylchlorides, polyethers, polyvinylpyrrolidone, Nafion™ polymer, poly(vinyl butyral)polymers, polycarbonates, polysulfones, polysiloxanes, polyetherimides, polyetherketones, and blends, and copolymers thereof. In the case of non-crosslinked materials, the dye can be added at various stages of polymer processing, including the extrusion stage. In the case of crosslinkable materials (for example, thermosetting plastics such as epoxies and crosslinked acryalte resins), the dyes must be added during the production of the crosslinkable material.

Non-limiting examples of suitable dyes that can be used in the ink and coating compositions of the present disclosure include, but are not limited to, bromocresol green, bromocresol purple, bromophenol blue, thymolphthalein, thymol blue, aniline blue WS, durazol blue 4R, durazol blue 8G, magenta II, mauveine, naphthalene blue black, orcein, pontamine sky blue 5B, naphthol green B, picric acid, martius yellow, naphthol yellow S, alcian yellow, fast yellow, metanil yellow, azo-eosin, xylidine ponceau, orange G, ponceau 6R, chromotrope 2R, azophloxine, lissamine fast yellow, tartrazine, amido black 10B, bismarck brown Y, congo red, congo corinth, trypan blue, Evans blue, Sudan III, Sudan IV, oil red O, Sudan black B, Biebrich scarlet, Ponceau S, woodstain scarlet, Sirius red 4B, Sirius red F3B, fast red B, fast blue B, auramine O, malachite green, fast green FCF, light green SF yellowish, pararosanilin, rosanilin, new fuchsin, Hoffman's violet, methyl violet 2B, crystal violet, Victoria blue 4R, methyl green, ethyl green, ethyl violet, acid fuchsin, water blue I, methyl blue, chrome violet CG, chromoxane cyanin R, Victoria blue R, Victoria blue B, night blue, pyronin Y, pyronin B, rhodamine B, fluorescein, eosin Y ws, ethyl eosin, eosin B, phloxine B, erythrosin B, rose bengal, Gallein, acriflavine, acridine orange, primuline, thioflavine T, thioflavine S, safranin O, neutral red, azocarmine G, azocarmine B, safranin O, gallocyanin, gallamine blue, celestine blue B, nile blue A, thionin, azure C, azure A, azure B, methylene blue, methylene green, toluidine blue O, alizarin, alizarin red S, purpurin, anthracene blue SWR, alizarin cyanin BBS, nuclear fast red, alizarin blue, Luxol fast blue MBS, alcian blue 8GX, saffron, Brazilin and Brazilein, hematoxylin and hematein, laccaic acid, Kermes, and carmine.

In various embodiments, the electrically responsive ink and coating compositions further comprise an electrolyte material. The electrolyte material primarily functions to move charge within the electrically responsive material. The concentration of the electrolyte in the electrically responsive coating is such that the ion conductivity of the coating is equal to or greater than about $10^{-8}$ S/cm. Suitable electrolyte materials may include ionic materials, solvent-based liquid electrolytes, polyelectrolytes, polymeric electrolytes, solid electrolytes, and gel electrolytes.

Examples of suitable gel electrolytes may include appropriate redox active components and small amounts of multiple ligand-containing polymeric molecules gelled by a metal ion complexing process. Organic compounds capable of complexing with a metal ion at a plurality of sites (e.g., organic compounds including ligating groups) may be used in various embodiments. A given redox component may be a liquid by itself or have solid components dissolved in a liquid solvent. Ligating groups are functional units that contain at least one donor atom rich in electron density, e.g., oxygen, nitrogen, sulfur, phosphorous, among others. Multiple ligating groups, which may be present in the polymeric material, may occur in either the side chain or part of the materials molecular backbone, in part of a dendrimer, or in a starburst molecule.

In various embodiments, the electrolyte composition may include a gelling compound having a metal ion and an organic compound capable of complexing with the metal ion at a plurality of sites. Suitable metal ions include alkali and alkaline earth metals, such as lithium. In one embodiment, the organic compound may be a polymeric compound. Suitable organic compounds include poly(4-vinyl pyridine), poly(2-vinyl pyridine), polyethylene oxide, polyurethanes, and polyamides. In one embodiment, the gelling compound may be a lithium salt having the chemical formula LiX, wherein X may be a suitable anion, such as, for example, a halide, perchlorate, thiocyanate, trifluoromethyl sulfonate, or hexafluorophosphate. In another embodiment, the electrolyte solution includes a compound of the formula $M_iY_j$, wherein i and j are both variables independently having a value greater than or equal to 1. Y may be a suitable monovalent or polyvalent anion such as a halide, perchlorate, thiocyanate, trifluoromethyl sulfonate, hexafluorophosphate, sulfate, carbonate, or phosphate, and M is a monovalent or polyvalent metal cation such as Li, Cu, Ba, Zn, Ni, lanthanides, Co, Ca, Al, Mg, or other suitable metals.

In one embodiment, the polymeric electrolyte may include poly(vinyl imidazolium halide) and lithium iodide and/or polyvinyl pyridinium salts. Suitable polyelectrolytes may include between about 5 percent and about 95 percent by weight of a polymer based on the total weight of the ink composition, such as for example, an ion-conducting polymer, and about 5 percent to about 95 percent by weight of a plasticizer based on the total weight of the ink composition. The ion-conducting polymer may include, for example, poly(ethylene oxide) (PEO), poly(propylene oxide) (PPO), poly (acrylonitrile) (PAN), poly(methyl methacrylate) (PMMA), poly(ethers), and poly(phenols).

In one embodiment, a polymeric electrolyte may be prepared by first combining the ionic salt (i.e., an electrolyte) with a polymer that functions as a carrier for the electrolyte. Suitable polymers for use in forming the polymeric electrolyte include poly(ethylene oxide) (PEO) and its derivatives and crown ether-containing compounds. In certain embodiments, in order to prevent the phase separation between the semi-conducting polymer and the ionic electrolyte polymer (such as PEO:Lithium salt), it may be desirable to employ a polymer having both electrical and ionic conductivities in the ink composition. In such embodiments, an additional polymeric ionic electrolyte may not be required in the ink composition.

In various embodiments, the electrically responsive ink composition further comprises a solvent. In various embodiments, the solvents used in the electrically responsive ink compositions are selected based on different parameters as discussed herein. In one embodiment, a suitable solvent may be selected to satisfy the solubility of various components in the electrically responsive ink composition including the binder material, the electrically responsive optical-state change material, and the electrically responsive pH modifier. In another embodiment, wherein the electrically responsive ink composition is used to deposit an electrically responsive coating composition, the solubility of the different components of the electrically responsive ink composition in the solvent should be such that there will be no phase separation of the different components during the post-deposition drying step. In a further embodiment, wherein the electrically responsive ink composition is used to deposit an electrically responsive coating composition on an article suitable solvents include those that exhibit a chemical inertness towards the material used to form the article. For example if the article is an optical article such as for example a DVD made using a polycarbonate, the selected solvent(s) should not induce solubilization, crystallization, or any other form of chemical or physical attack of the polycarbonate. This is essential to preserve the readability of the data underneath the electrically responsive coating composition. In one embodiment, in the case of solvent mixtures the volume fraction of any solvent that could potentially attack the polycarbonate may be less than about 30 percent. As used herein the term "surface tension" refers to a property of the liquid that affects the spreading of a liquid on a surface. The surface tension will have a dramatic result on the final shape of a drop or multiple drops of liquid printed on solid surfaces. With respect to the ink formulations of the present disclosure, surface tension is a critical parameter for printing the ink formulations using conventional printing techniques such as, but not limited to, inkjet printing and screen-printing. Surface tension is also a parameter for the jetting process itself during inkjet printing, as it will affect how drops are formed at the print head. If the surface tension is not appropriate, inks will not be jettable with inkjet printing.

Other aspects of suitable solvents include, but are not limited to, low vapor pressure and high boiling points so that the electrically responsive ink composition is printable by methods known to one skilled in the art, such as for example, screen printing or ink-jet printing methods. Solvents with lower boiling points may evaporate rapidly from the ink, causing clogging of inkjet print head nozzles or drying onto a printing screen, either of which can lead to poor quality of the resultant electrically responsive coating. In one embodiment, a solvent with a boiling point above 130° C. is preferred. In various embodiments, the electrically responsive ink composition should be a physical mixture of the various components and there should be no reactivity between the components at least under ambient conditions.

In one embodiment, suitable solvents employed in the electrically responsive ink composition include, but are not limited to a glycol ether solvent, an aromatic hydrocarbon solvent containing at least 7 carbon atoms, an aliphatic hydrocarbon solvent containing at least 6 carbon atoms, a halogenated solvent, an amine based solvent, an amide based solvent, an oxygenated hydrocarbon solvent, or miscible combinations thereof. Some specific suitable non-limiting examples of such solvents include diacetone alcohol, dipropylene glycol methyl ether (Dowanol DPM), 1-methoxy-2-propanol (Dowanol PM), butyl carbitol, ethylene glycol, glycerol with glycol ethers, cyclohexanone, and miscible combinations thereof.

In various embodiments, the electrically responsive ink and coating compositions further comprise a binder material. The primary function of the binder materials is to assist the adherence of an electrically responsive ink composition to the surface of an article on which the electrically responsive ink composition is deposited. In one embodiment the binder material may be an ion-conducting polymeric material. The ion-conducting polymeric material may include, but is not limited to, a polymer and an ionic salt, wherein the polymer component comprises of linear homopolymers, cross-linked polymers, copolymers, branched polymers, polymer blends, or polymer precursors. In another embodiment the ion-conducting polymeric material may include, but is not limited to, a polymer and an ionic salt, wherein the ionic salt comprises ionic liquids, metal salts, alkali salts, alkaline earth salts, onium salts, ammonium salts, phosphonium salts, lithium salts, sodium salts, potassium salts, cesium salts or combinations thereof. The anions of the lithium salts, sodium salts, potassium salts, cesium salts or ammonium salts may be selected from, but not limited to, the group consisting of I, Br, $ClO_4$, $BF_4$, $PF_6$, $CF_3COO$, $CF_3SO_3$, SCN, $N(CF_3SO_2)_2$ or combinations thereof. Non-limiting examples of suitable polymer classes used in electrochromic polymeric materials include one or more of a polymer, an oligomer, a polymeric precursor, and a polymerizable monomer. Suitable non-limiting examples of polymeric materials which can be used as binders include poly(alkenes), poly(anilines), poly(thiophenes), poly(pyrroles), poly(acetylenes), poly(dienes), poly(acrylates), poly(methacrylates), poly(vinyl ethers), poly(vinyl thioethers), poly(vinyl alcohols), poly(vinyl ketones), poly(vinyl halides), poly(vinyl nitriles), poly(vinyl esters), poly(styrenes), poly(arylenes), poly(oxides), poly(carbonates), poly(esters), poly(anhydrides), poly(urethanes), poly(sulfonates), poly(siloxanes), poly(sulfides), poly(thioesters), poly(sulfones), poly(sulfonamides), poly(amides), poly(ureas), poly(phosphazenes), poly(silanes), poly(silazanes), poly(benzoxazoles), poly(oxadiazoles), poly(benzothiazinophenothiazines), poly(benzothiazoles), poly(pyrazinoquinoxalines), poly(pyromellitimides), poly(quinoxalines), poly(benzimidazoles), poly(oxindoles), poly(oxoisoindolines), poly(dioxoisoindolines), poly(triazines), poly(pyridazines), poly(piperazines), poly(pyridines), poly(piperidines), poly(triazoles), poly(pyrazoles), poly(pyrrolidines), poly(carboranes), poly(oxabicyclononanes), poly(dibenzofurans), poly(phthalides), poly(acetals), poly(anhydrides), carbohydrates, blends of the above polymeric materials, and copolymers thereof.

In one embodiment, the electrically responsive ink composition comprises a polymerizable monomer, such as an acrylate monomer (e.g., methyl methacrylate), which can be polymerized (i.e. cured) to form an electrically responsive coating after the electrically responsive ink composition has been deposited on an optical article. In various embodiments the electrically responsive ink and coating compositions comprise a binder material which is a copolymer is one member selected from the group consisting of a block copolymer, a random copolymer, or a graft copolymer. In one embodiment, the polymer component comprises a graft copolymer such as poly(methyl methacrylate-co-ethylene oxide copolymer, a polystyrene-ethylene oxide copolymer, a poly(styrene-methyl methacrylate-ethylene oxide), a poly(carbonate-ethylene oxide) copolymer or a poly(carbonate-propylene oxide) copolymer. In one embodiment, the polymer component comprises a Nafion™ polymer, a poly(vinyl butyral) polymer, or a poly(vinylpyrrolidone-co-vinyl acetate) copolymer. Other ethylene oxide-containing copolymers are preferred including those prepared by polymerizing PEG methacrylate or PEG acrylate with other methacrylates or acrylates. Aspects of the embodiments described herein can be used in combination with the materials, systems and techniques previously disclosed in U.S. patent application Ser. No. 11/763,927 and Ser. No. 11/763,942. Thus the disclosures of U.S. patent application Ser. No. 11/763,927 and Ser. No. 11/763,942, filed Jun. 15, 2007, are both hereby incorporated by reference in their entireties.

In various embodiments, the electrically responsive ink and coating compositions may further include a plasticizer. Plasticizers are typically low molecular weight non-volatile substances which, when added to the polymer matrix, alter the properties of the matrix. For example, adding a plasticizer can increase the ionic conductivity of the ion conducting polymer matrix, decrease the glass transition temperature of the polymer, increase the flexibility of the material, reduce the crystallinity of the polymer matrix, increase the polymer segmental motion and/or increase compatibility between the polymer and electrolyte blends. The plasticizer may assist in the dissociation of the ionic salt (i.e., electrolyte). The plasticizer needs to be compatible with the polymer so that phase separation of the plasticizer from the polymer matrix, resulting in poor film quality and/or decrease in ion conductivity, does not occur. In one embodiment, the plasticizers may have a boiling point greater than about 80° C. Examples of suitable plasticizers include ethylene carbonate, propylene carbonate, mixtures of carbonates, dimethyl carbonates, polyethylene glycol dimethyl ether, ethylene glycol, tetraethylene glycol, butyrolactone, dialkylphthalates (e.g., bis(2-ethylhexyl)phthalate and dibutylphthalate), 1,3-dioxolane, glymes such as tetraglyme, hexaglyme and heptaglyme, ionic liquids such as imidazolium salts (e.g., 1-methyl-3-octyl imidazolium bromide) and pyrrolidinium salts (e.g., 1-butyl-1-methylpyrrolidiniun bis(trifluoromethylsulfonyl)imide, polycaprolactone triol, bis(2-ethylhexyl)fumerate, bis(2-butoxyethyl)adipate, bis(2-ethylhexyl)sebacate, cellulose acetate, bis(2-ethylhexyl)adipate, glycerol propoxylate, bis(2-(2-butoxy)ethyl) adipate, triethylene glycol bis(2-ethylhexanoate)polyethyleneimine, diisodecyl adipate, bis(3,4-epoxy cyclohexylmethyl)adipate, trioctyl trimellitate, dimethylformamide and dimethylsulfoxide.

In one embodiment, the electrically responsive ink and coating compositions may further comprise an electrically responsive pH modifier. The electrically responsive pH modifier may be in one embodiment an electrically responsive material which is capable of generating either a Bronsted acid or a Bronsted base upon electrical stimulus. Suitable non-limiting examples of electrically responsive pH modifiers include, biphenol, mono-, di- and tri-hydroxy substituted aromatics (e.g., hydroquinone), and poly(hydroxystyrene). In one embodiment, the electrically responsive material includes biphenol, biphenol derivative, and combinations thereof. General structural examples of suitable biphenol derivatives can be found in U.S. patent application Ser. No. 10/391,401, filed Mar. 18, 2003. Suitable non-limiting examples of biphenol and biphenol derivatives include 4,4'- biphenol, 3,3'-biphenol, 2,2'-biphenol, 2,2',6,6'-tetramethyl-3,3',5,5'-tetrabromo-4,4'-biphenol, 2,2',6,6'-tetramethyl-3,3',5-tribromo-4,4'-biphenol, 3,3'-dimethylbiphenyl-4,4'-diol, 3,3'-ditert-butylbiphenyl-4,4'-diol, 3,3',5,5'-tetramethylbiphenyl-4,4'-diol, 2,2'-ditert-butyl-5,5'-dimethylbiphenyl-4,4'-diol, 3,3'-ditert-butyl-5,5'-dimethylbiphenyl-4,4'-diol, 3,3',5,5'-tetratert-butylbiphenyl-4,4'-diol, 2,2',3,3',5,5'-hexamethylbiphenyl-4,4'-diol, 2,2',3,3',5,5',6,6'-octamethylbiphenyl-4,4'-diol, 3,3'-di-n-hexylbiphenyl-4,4'-diol, 3,3'-di-n-hexyl-5,5'-dimethylbiphenyl-4,4'-diol, and the like.

As described herein, the term "electrically responsive ink composition" is used to describe a liquid composition comprising various components as described above. In one embodiment, the electrically responsive ink composition has a viscosity in a range from about 0.1 cPs to about 10,000 cps. In another embodiment, the ink composition has a viscosity in a range from about 5 cPs to about 100 cPs. In yet another embodiment, the ink composition has a viscosity in a range from about 7 cPs to about 12 cPs. In various embodiments, the viscosity of the electrically responsive ink composition may be tuned by controlling the concentration, such as for example the weight percent of the various components of the electrically responsive ink composition, and/or by carefully controlling a particular property of a specific component of the electrically responsive ink composition such as for example the molecular weight of the binder material.

As discussed above, the electrically responsive ink composition or coating composition is capable of transforming from a first optical state to a second optical state upon exposure to an electrical stimulus. The change from the first optical state to the second optical state occurs due to the presence of the electrically responsive optical-state change material. In one embodiment, the electrically responsive transformation from the first optical state to the second optical state is a bistable transformation. As used herein, the term "bistable transformation" is defined as a condition where the optical state of the electrically responsive ink composition corresponds to one of two possible free energy minima and the ink composition remains in its current optical state in the absence of an external electrical stimulus.

In one embodiment, the difference in the optical reflectivity of the coating composition between the first optical state and the second optical state is at least 10 percent. As used herein the term "reflectivity" is defined as the ratio of reflected light to incident light.

In various embodiments, the electrically responsive ink or coating compositions have a maximum optical absorbance in a range of about 200 nm to about 800 nm. In another embodiment, the electrically responsive ink composition has a maximum optical absorbance in a range of about 300 nm to about 700 nm. In yet another embodiment, the electrically responsive ink composition has a maximum optical absorbance in a range of about 400 nm to about 650 nm. It will be appreciated that the specific wavelengths for which the absorbance of the composition is maximized may be chosen to correspond to a particular application. For instance, if the composition is intended for use with DVD systems, the choice of wavelength should desirably correspond to the wavelengths in use in DVD players.

In one embodiment, at least one component of the electrically responsive ink composition may be encapsulated inside an electrically responsive coating material. The electrically responsive coating material serves to segregate the encapsulated component from additional components of the electrically responsive ink composition. The electrically responsive coating material is selected such that it can be fractured at a particular voltage, thereby freeing the encapsulated component to interact with at least one additional component of the electrically responsive ink composition. In one embodiment, the electrically responsive optical-state change material may be encapsulated inside the electrically responsive coating material. In yet another embodiment, a Bronsted acid may be encapsulated inside the electrically responsive coating material. In still yet another embodiment, a Bronsted base may be encapsulated inside the electrically responsive coating material.

In another embodiment, the electrically responsive ink composition further comprises at least one pH modifier. Suitable pH modifiers include either acids or bases. These acids may be of various types, including a mineral acid, an organic acid, a Lewis acid, a Bronsted acid, a superacid, and an acid salt. Suitable non-limiting examples of acids include acetic acid, trifluoroacetic acid, hydrochloric acid, nitric acid, sulfuric acid, benzoic acid, toluene sulfonic acid, ethanoic acid, oxalic acid, and citric acid. Examples of the types of bases include an organic base, a Lewis base, a Bronsted base, a superbase, and basic salts. Suitable non-limiting examples of bases include ammonia, triethylamine, methyl amine, cyclohexylamine, dicyclohexylamine, 1,8-bis(dimethylamino) naphthalene, 1,4-diazabicyclo[2.2.2]octane, pyridine, imidazole, potassium hydroxide, and sodium hydroxide.

In yet another embodiment, the electrically responsive ink composition further comprises at least one anti-photobleaching agent. Photobleaching of the electrically responsive coating composition may occur through either a photoinduced oxidation and/or a photothermal degradation process. The anti-photobleach agent is added to retard the photo-induced degradation of the electrically responsive coating composition when exposed to either ultraviolet or visible light. Suitable non-limiting examples of anti-photobleach agents include, biphenol, mono-, di- and tri-hydroxy substituted aromatics (e.g., hydroquinone), and poly(hydroxystyrene). A general reference which describes various classes of anti-photobleach is F. Gugumus, "Light Stabilizers", in Plastics Additives Handbook, 5th Ed., H. Zweifel, ed., Hanser Publishers, 2001, pp. 141-425. In one embodiment, biphenol, biphenol derivative, or combinations thereof effectively reduces photobleaching. General structural examples of suitable biphenol derivatives can be found in U.S. patent application Ser. No. 10/391,401, filed Mar. 18, 2003. Suitable non-limiting examples of biphenol and biphenol derivatives include 4,4'-biphenol, 3,3'-biphenol, 2,2'-biphenol, 2,2',6,6'-tetramethyl-3,3',5,5'-tetrabromo-4,4'-biphenol, 2,2',6,6'-tetramethyl-3,3',5-tribromo-4,4'-biphenol, 3,3'-dimethylbiphenyl-4,4'-diol, 3,3'-ditert-butylbiphenyl-4,4'-diol, 3,3',5,5'-tetramethylbiphenyl-4,4'-diol, 2,2'-ditert-butyl-5,5'-dimethylbiphenyl-4,4'-diol, 3,3'-ditert-butyl-5,5'-dimethylbiphenyl-4,4'-diol, 3,3',5,5'-tetratert-butylbiphenyl-4,4'-diol, 2,2',3,3',5,5'-hexamethylbiphenyl-4,4'-diol, 2,2',3,3',5,5',6,6'-octamethylbiphenyl-4,4'-diol, 3,3'-di-n-hexylbiphenyl-4,4'-diol, 3,3'-di-n-hexyl-5,5'-dimethylbiphenyl-4,4'-diol, and the like.

In one embodiment, the present invention includes an electrically responsive coating composition, deposited using an electrically responsive ink composition, wherein the electrically responsive coating composition comprises at least one electrically responsive optical-state change material, at least one electrolyte material, and at least one binder material, wherein the electrically responsive coating composition is essentially free of solvent, and the electrically responsive coating composition has a maximum optical absorbance in a range from about 200 nm to about 800 nanometers, and wherein the electrically responsive coating composition is capable of transforming from a first optical state to a second optical state upon exposure to an electrical stimulus. As used herein, the term "essentially free of solvent" means that the electrically responsive coating composition may contain less than about 0.1 weight percent of solvent based on the total weight of the electrically responsive coating composition. In another embodiment the electrically responsive coating described above further comprises an optional plasticizer material. In another embodiment the electrically responsive coating described above further comprises an optional electrically responsive pH modifier material. In yet another embodiment, the present invention provides an article comprising the electrically responsive coating composition deposited in or deposited on the article.

As used herein, the term "coating" describes a layered film structure. In certain embodiments, the layered film structure may comprise a single layer. In one embodiment, the thickness of the coating is in a range from about 0.1 micron to about 100 microns. In another embodiment, the thickness of the coating is in a range from about 0.1 micron to about 0.5 microns. In yet another embodiment, the thickness of the coating is in a range from about 0.1 micron to about 0.25 microns.

In one embodiment, the electrically responsive coating composition may be deposited on an article using the electrically responsive ink composition by employing methods known to one skilled in the art. For example, screen-printing and ink-jet printing methods can be used. In one embodiment, the article is an optical article. The electrically responsive ink composition may be converted to the corresponding electrically responsive coating composition, using methods known to one skilled in the art. Exemplary methods include air drying at ambient conditions, drying under controlled temperature conditions such as for example in an oven, drying under vacuum, and the like.

In one embodiment, the electrically responsive coating composition has a maximum optical absorbance in a range of about 200 nm to about 800 nm. In another embodiment, the electrically responsive coating composition has a maximum optical absorbance in a range of about 300 nm to about 700 nm. In yet another embodiment, the electrically responsive coating composition has a maximum optical absorbance in a range of about 400 nm to about 650 nm. As discussed above, it will be appreciated that the specific wavelengths for which the absorbance of the composition is maximized may be chosen to correspond to a particular application.

As used herein, the term "optical article" refers to an article that includes an optical data layer for storing data. The stored data may be read by, for example, an incident laser light of an optical data reader device such as a standard compact disc (CD) or digital versatile disc (DVD) drive, commonly found in most computers and home entertainment systems. In some embodiments, the optical article may include one or more data layers. Furthermore, the optical data layer may be protected by employing an outer coating, which is transparent to the incident laser light light, and therefore allows the incident laser light to pass through the outer coating and reach the optical data layer. Non-limiting examples of optical articles include a compact disc (CD); a digital versatile disc (DVD); multi-layered structures, such as DVD-5 or DVD-9; multi-sided structures, such as DVD-10 or DVD-18; a high definition digital versatile disc (HD-DVD); a Blu-ray disc; a near field optical storage disc; a holographic storage medium; and a volumetric optical storage medium, such as, a multi-photon absorption storage format. In other embodiments, the optical article may also include an identification card, a passport, a payment card, a driver's license, a personal information card, or any other documents or devices, which employ an optical data layer for data storage.

In one embodiment, the optical article further comprises a wireless activation tag (also referred to as WPFT, wirelessly-powered flexible tag), which is operatively coupled (e.g., in electrical communication) to the electrically responsive coating composition. The electrically responsive coating composition is one part of an anti-theft system designed to prevent the unauthorized use of the optical article, designed to work in combination with additional components of the anti-theft system such as a removable wireless activation tag. Further details of the use of tags with optical articles as described herein can be found in U.S. patent application Ser. No. 11/567,271, filed Dec. 6, 2006.

The WPFT may be in electrical communication with electrical circuitry located in the packaging of the optical article. In one embodiment, the electrical circuitry may draw upon a source for electrical energy such as a battery or charged capacitor in the packaging. At the POS the electrical circuitry in the packaging may then form electrical connections with the activation source, thereby providing the electrical energy to the electrically responsive coating. In one embodiment, the battery is made a part of the WPFT itself by using a printable battery.

In one embodiment, when the electrically responsive ink composition or the electrically responsive coating composition is in the first optical state the optical article may be considered to be in a pre-activated state of functionality and when the electrically responsive ink composition or the electrically responsive coating composition is in the second optical state the optical article may be considered to be in an activated state of functionality. In one embodiment, the difference in the percent optical reflectivity or the percent reflectivity of at least one portion of the optical data layer in the "pre-activated state" of functionality and the "activated" state of functionality is at least about 10 percent. In another embodiment, the difference in the percent optical reflectivity or the percent reflectivity of at least one portion of the optical data layer in the "pre-activated state" of functionality and the "activated" state of functionality is at least about 15 percent. In yet another embodiment, the difference in the percent optical reflectivity or the percent reflectivity of at least one portion of the optical data layer in the "pre-activated state" of functionality and the "activated" state of functionality is at least about 20 percent.

In various embodiments, the optical article comprising the electrically responsive coating composition may be transformed from a "pre-activated" state of functionality to an "activated" state of functionality. Conversion from the "pre-activated" state of functionality to the "activated" state of functionality is achieved by the activation of the electrically responsive coating composition, which is deposited in or on the optical article, such that the electrically responsive coating composition is in optical communication with the optical data layer. As used herein, the term optical communication refers to transmission and reception of light by optical devices. The electrically responsive coating composition is activated by interacting with one or more stimuli, e.g., electrical stimuli, applied directly to the electrically responsive coating composition. In one embodiment, the electrically responsive coating composition is capable of irreversibly altering the state of functionality of the optical article. In the "pre-activated" state, at least one portion of the data from the optical data layer is unreadable by the incident laser light of an optical data reader device, however, this same portion of data can be read from the optical data layer in the "activated" state of functionality.

The electrically responsive coating composition disclosed herein is capable of transforming from a first optical state to a second optical state upon exposure to a direct electrical stimulus. As used herein, the term "direct" when used with respect to the application of the electrical stimulus to the electrically responsive ink coating composition refers to an embodiment wherein the electrical stimulus is in physical contact with the electrically responsive coating composition.

As used herein, the term "pre-activated" state of functionality refers to a state of functionality of the optical article where the electrically responsive coating composition has not yet been exposed to one or more external stimuli, while the "activated" state refers to a state of functionality where the electrically responsive coating composition has been exposed to the external stimuli. In one embodiment, the "pre-activated" state comprises at least one electrically responsive coating composition which inhibits portions of the optical data layer that are located directly in the optical path of the incident laser light of an optical data reader from being read. The activated state comprises a state of the optical article where the optical data layer can be read by the optical data reader as a result of the article being exposed to at least one external stimulus.

In another embodiment, at least one electrically responsive coating composition is at least partially transparent to the incident laser light of an optical data reader in the pre-activated state, allowing the data on the optical layer located directly in the optical path of the laser light to be read. In this embodiment, the electrically responsive coating composition at least partially absorbs the laser light from the optical data reader in the activated state and prevents the data directly in the optical path of the laser light from being read.

The change in the optical properties of the electrically responsive coating composition upon activation can occur using at least two approaches. In the first approach, the electrically responsive coating composition at least partially absorbs the incident laser light from an optical data reader in the "pre-activated" state, and the data directly in the optical path of the laser light cannot be read. In this instance, the content stored in the optical article below the electrically responsive coating is unplayable. Upon converting the optical article to the "activated" state using an external stimulus, the electrically responsive coating composition is at least partially transparent to the incident laser light from an optical data reader, the data directly in the optical path of the laser light can be read, and the content below the electrically responsive optical coating is playable.

The second approach may require an additional "authoring" component, which allows the disc to be playable or unplayable, depending on whether portions of the data on the optical data layer can be read by the incident laser light from an optical data reader. An explanation of the term "authoring" as it relates to an optical article, such as a DVD, can be found in "DVD Authoring and Production", by Ralph LaBarge, CMP Books, 2001. In this second approach, the electrically responsive coating composition is at least partially transparent to the incident laser light from an optical data reader in the "pre-activated" state, and the data directly in the optical path of the laser light can be read. In this instance, the optical article is "authored" unplayable. Upon converting the optical article to the "activated" state using an external stimulus, the incident laser light from the optical data reader electrically responsive coating composition is at least partially absorbed by electrically responsive coating composition, the data directly in the optical path of the laser light cannot be read, and the disc is "authored" playable.

In one embodiment the term "damaged" state refers to a state of functionality of the optical article where the optical article has undergone a physical modification such as, but not limited to, a scratch, a dimple, or a physical modification in or on the optical article. The "damaged" state may be a result of improper activation of one or more optical-state change materials in or on the optical article. In the "damaged" state at least a portion of the optical data layer cannot be read by the laser light of an optical data reader as a result of significant absorbance of the laser light by at least a portion of at least one electrically responsive optical-state change material. In contrast to the "activated" state, where all the electrically responsive coating composition is sufficiently transparent to the laser light from the optical data reader, in the "damaged" state at least a portion of the electrically responsive coating composition absorbs at least a portion of the wavelength of the incident laser light from the optical data reader and prevents the data directly in the optical path of the laser light from being read.

In various embodiments, the optical article comprises one or more electrically responsive layers having a first surface and a second surface. In embodiments where two or more electrically responsive layers are employed, each of the electrically responsive layers may be located at a unique location on the optical article, designed to function in concert as part of the anti-theft system. In one embodiment, at least two electrically responsive layers are in direct physical contact with each other, (i.e., juxtaposed next to each other). In various embodiment, the electrically responsive layers may be disposed on the optical article in the various forms selected from one or more of concentric lines, concentric arcs, concentric spots, patterned lines, patterned arcs, patterned spots, or lines or arcs which are positioned end-to-end. In one embodiment an optical article comprises at least two electrically responsive layers, wherein at least one electrically responsive layer is not transparent to the incident laser light of an optical data reader in the "pre-activated" state.

If the article is converted from the "pre-activated" state to the "damaged" state as a result of improper activation, the optical properties of each of the spots are designed to change irreversibly such that at least a portion of at least one of the spots absorbs the laser light from the optical data reader, and prevents the data directly in the optical path of the laser light from being read.

For example, in one embodiment the optical article comprises two spots, a first spot having an optical absorbance greater than about 0.35 in the "pre-activated" state (a spot with absorbance of 0.35 at the wavelength of the laser light partially absorbs the laser light such that the reflectivity of the optical article is about 45 percent), and the second spot having an optical absorbance less than about 0.35 in the "pre-activated" state. Upon activation, the optical article is converted to the "activated" state where the optical properties of only the first spot is transformed such that the optical absorbance is less than about 0.35. In at least one embodiment the difference in optical absorbance between the first optical state and the second optical state of the electrically responsive coating composition is at least 0.1. Upon improper activation, the optical article is converted to a "damaged" state where the optical absorbance of the first spot is transformed such that the optical absorbance is less than about 0.35 and the optical absorbance of the second spot is transformed such that the optical absorbance is greater than about 0.35. In one embodiment the transformation of the optical absorbance of either a single spot, or a combination of spots, can be combined with an additional "authoring" component, which is described above, to create a mechanism for distinguishing between a "pre-activated" state, an "activated" state, and a "damaged" state.

The change in optical properties of the electrically responsive coating composition in or on optical article upon exposure to a external stimulus (e.g., from the activation system) can appear in any manner that results in the optical data reader system receiving a substantial change in the amount of optical reflectivity detected. For example, where the electrically responsive coating composition is initially opaque and becomes more transparent upon exposure to an external stimulus, there should be a substantial increase in the amount of light reflected off of the data storage layer and transmitted to the optical reader device. For example, most blue materials typically change (reduce) the amount of reflected incident radiation detected by means of selective absorption at one or more given wavelengths of interest (e.g., 650 nm) corresponding to the type of optical data reader system.

In another example, where the optical article includes a DVD, in one embodiment, the "pre-activated" state of functionality is characterized by an optical reflectivity of at least a portion of the optical article being substantially less than about 45 percent. In another embodiment, the "pre-activated" state of functionality is characterized by an optical reflectivity of at least a portion of the optical article being less than about 20 percent. In yet another embodiment, the "pre-activated" state of functionality is characterized by an optical reflectivity of at least a portion of the optical article being less than about 10 percent. In these embodiments, the data in the optical data layer of the optical storage medium is not readable in the pre-activated state. It should be appreciated that any portion of the optical article that has an optical reflectivity of less than about 45 percent may not be readable by the optical data reader of a typical DVD player. Furthermore, the activated state is characterized by an optical reflectivity of that same portion of the optical article being substantially more than about 45 percent.

It should be appreciated that there are analogous predetermined values of optical properties for activating different optical articles. For example, the specified (as per ECMA-267) minimum optical reflectivity for DVD-9 (dual layer) media is in a range from about 18 percent to about 30 percent and is dependent upon the layer (0 or 1).

The electrically responsive coating composition may render the optical article partially or completely unreadable in the pre-activated state of functionality of the optical article. In the pre-activated state, the electrically responsive coating composition may act as a read-inhibit layer by preventing the incident laser light of an optical data reader from reaching at least a portion of the optical data layer and reading the data on the optical data layer. For example, the electrically responsive coating composition may absorb a major portion of the incident laser light, thereby preventing it from reaching the optical data layer to read the data.

Upon interaction with one or more external stimuli, the optical absorbance of the electrically responsive coating composition may be altered to change the functionality of the optical article from the pre-activated state to the activated state. For example, in the pre-activated state, the electrically responsive coating composition may render the optical article unreadable by absorbing a portion of the wavelength from the incident laser light of an optical data reader. However, upon interaction with an external stimulus the electrically responsive coating composition becomes transparent to the wavelength of the laser light used to read the optical article, thereby making the portion of the optical data layer which is located directly in the optical path of the laser light from the optical data reader readable in the activated state. Suitable examples of external stimuli which can generate an electrical stimulus may include a laser light, infrared radiation, thermal energy, X-rays, gamma rays, microwaves, visible light, ultraviolet light, ultrasound waves, radio frequency waves, microwaves, electrical energy, chemical energy, magnetic energy, or combinations thereof which generate a stimulus. The interaction of the external stimulus with the optical article may include continuous, discontinuous, or pulsed forms of the external stimulus.

During activation, a direct current (DC) voltage may be applied to the electrically responsive layer in a continuous, discontinuous or pulsed form. This results in a change in the optical absorbance of the electrically responsive layer such that the incident laser light may pass through the electrically responsive layer and reach the optical data layer. In one embodiment, the source of the voltage may be electrodes, which may be in direct contact with the electrically responsive layer. The electrodes may be patterned, screen-printed, or inkjet printed. Suitable materials that may be used as the electrode materials include gold, silver, copper, titanium, nickel, aluminum, lithium, carbon, indium, tin, zinc, platinum and conjugated polymers. The electrodes may be in contact with electrically conductive pads that conduct the electricity to at least a portion of the electrically responsive layer through the electrodes.

In some embodiments, a portion of the optical article having the electrically responsive layer may undergo a change in an optical reflectivity of at least about 10 percent while transforming from a first optical state to a second optical state. In these embodiments, the change in the optical reflectivity may be brought about upon exposure to a voltage difference of 0.1 Volts to about 50 Volts applied across the electrically responsive layer. In other embodiments, a portion of the optical article having the electrically responsive layer may undergo a change in an optical transmittance by more than about 10 percent from a first optical state to a second optical state. In these embodiments, the change in the optical transmittance may be brought about upon exposure to a voltage difference of 0.1 Volts to about 50 Volts applied across the electrically responsive layer in a time duration of less than or equal to about 30 seconds.

In various embodiments, the electrically responsive coating composition may be deposited in a discrete area on the optical article, such that at least one spot, at least one line, at least one radial arc, at least one patch, a continuous layer, or a patterned layer extends across at least a portion of the optical article. One or more electrically responsive coating compositions may be deposited on the optical article in various forms, such as a discrete portion, a continuous film, or a patterned film. During authorization, the electrically responsive coating composition may be stimulated in a continuous, discontinuous or pulsed form.

Alternatively, instead of being deposited on the surface of the optical article, the electrically responsive coating composition may be deposited inside the structure of the optical article. In optical storage articles, the electrically responsive coating composition may be deposited in the substrate on which the optical data layer is deposited. In such an embodiment, the electrically responsive coating composition may be mixed with the substrate material of the optical article. In alternate embodiments, the electrically responsive coating composition may be deposited between the layers of the optical article, or may be deposited within a layer of the optical article. For example, the electrically responsive coating composition may be incorporated in the UV curable adhesive of the bonding (spacer) layer. In this case it should be appreciated that these electrically responsive coating compositions should be thermally stable to withstand the manufacturing temperatures of the optical article. Also, these electrically responsive coating compositions may preferably absorb the wavelength of the laser light in one of the activated, or the pre-activated state of the optical article. Upon interaction with external stimulus, the electrically responsive coating composition present inside the substrate changes color. As a result, the substrate may become transparent to the laser light, thereby facilitating the transmittance of laser light through the substrate and making the optical article readable.

In some embodiments, at least a portion of the electrically responsive coating composition is coated with an optically transparent second layer. The optically transparent second layer serves as a protective coating for the electrically responsive coating composition from chemical and/or physical damage. The optically transparent second layer may contain cross-linkable materials that can be cured using ultraviolet (UV) light or heat. Furthermore, the optically transparent second layer may be a scratch resistant coating. For example, the optically transparent second layer may include, but is not limited to, a matrix consisting of cross-linkable acrylates, silicones, and nano silicate particles. Suitable examples of an optically transparent second layer can be found in U.S. Pat. No. 5,990,188.

In still another embodiment, of the present invention is provided a method for transforming an electrically responsive ink composition or an electrically responsive coating composition from a first percent optical reflectivity to a second percent optical reflectivity, the method comprising the step of exposing the electrically responsive ink composition or the electrically responsive coating to a time-dependent electrical stimulus.

In another embodiment, the invention provides a method for changing the functionality of an optical article, comprising the steps of attaching an electrical element to the optical article such that the electrical element is in electrical contact with an electrically responsive coating composition, sending an electrical signal from an activation device to the electrical element, applying a time-dependent electrical current to the electrical element, transferring energy from the electrical element to the electrically responsive coating composition, resulting in a change in optical reflectivity of the electrically responsive coating composition, and transforming the optical article from a pre-activated state of functionality to an activated state of functionality, and removing the electrical element from the optical article.

EXAMPLES

Example 1 Provides an Electrically Responsive Ink Composition and a Method for Preparing the Same Lithium perchlorate (LiClO$_4$, Aldrich, CAS 7791-03-9) (0.36 grams (g), 3.4 millimoles (mmol)) was dissolved in a mixture of polyethylene glycol (600 g), diacrylate (SR610, Sartomer) (0.66 g), trimethylolpropane triacrylate (SR351, Sartomer) (1.26 g), polyethylene glycol 400 (PEG-400, Fluka, CAS 25322-68-3) (1.74 g), and propylene carbonate (PC, Aldrich, CAS 108-32-7) (1.8 g) by stirring at room temperature for 24 hours (h). To the mixture was added biphenol (BP, Aldrich, CAS 92-88-6) (0.09 g, 0.51 mmol) and bromocresol green sodium salt (BCG-Na, Aldrich, CAS 62625-32-5) (0.02 g, 0.028 mmol) resulting in a green solution. A small amount of JEFFAMINE ED-900 Polyetheramine (XTJ-501, Huntsman) (~70 mg) was added to the mixture to adjust the pH of the solution until the solution was blue in color. This was followed by the addition of a UV cure catalyst, Darocur-1174 (0.18 g) to provide an ink composition.

Example 2 Provides an Electrically Responsive Coating Composition and a Method for Preparing the Same A thin film of an electrically responsive coating composition was prepared using the ink composition prepared in Example 1. A small amount of the ink composition (about 1 drop) was draw coated onto patterned surface electrodes (0.1 micrometer of titanium, 4 micrometer of copper, 1 micrometer of nickel, and then 1 micrometer of gold on the surface of Kapton film) using a mask approximately 45 micrometers thick and immediately subjected to a 3 second pulse of intense UV exposure using a Xenon Corp (RC-747, Wilmington, Mass.) UV cure lamp filtered through a 500 nm line per-inch Ronchi Ruling filter (EO Edmund Industrial Optics, Barrington, N.J.) resulting in a blue film approximately 45 μm thick.

Example 3 Provides a Method for Electrically Activating an Electrically Responsive Coating Composition The blue film of the electrically responsive coating composition prepared in Example 2 was activated as follows. The blue film was subjected to a voltage (current<1 mA) using the patterned surface electrodes (length 3 mm) and a gap of 1 mm between the electrodes. A voltage (20 V) was applied to the film for 5 seconds, which initiated a color change in the film (on top of and around the anode) from blue to yellow. The time taken for the color change was approximately 2 minutes. The percent reflectivity of the film was measured at 650 nm using an Ocean Optics USB2000 fiber optic spectrometer throughout the electrolysis experiment.

Referring to FIG. 1 the graph (10) shows the percent reflectivity plotted on the y-axis (14) versus time plotted on the x-axis (12). A voltage of (40 V) was applied across the electrodes for about 5 seconds. The voltage was switched on 10 seconds and switched of at 15 seconds. The resultant curve (16) showed an increase in percent reflectivity of the film from about 12 percent to about 60 percent over a time period of about 120 seconds.

Example 4 Provides a Method for the Preparation of a poly(methyl methacrylate-co-elthylene glycol)copolymer (PMMA-PEG)

2,2'Azobis(2-methylpropionitrile) (Aldrich, CAS 78-67-1) (0.5 g, 0.5 wt %) was added to a flask containing deoxygenated Dowanol PM (1-methoxy-2-propanol, Aldrich, CAS 107-98-2) (80 g), methyl methacrylate (MMA, Aldrich, CAS 80-62-6) (18 g) and poly(ethylene glycol) methacrylate (PEGMA, Mw 526, Aldrich, CAS 25736-86-1) (2 g) under a nitrogen atmosphere and stirred. The mixture was stirred at 60° C. for 16 h. The mixture was cooled to room temperature and methylene chloride (100 mL) was added. The mixture was added to a solution of methanol (1 L) to precipitate the polymer. The polymer was isolated by vacuum filtration, washed with methanol, and dried under vacuum resulting in 14 g of the polymer. The molecular weight of the PMMA-PEG copolymer was determined using gel permeation chromatography (GPC) using a light scattering detector. The weight average molecular weight Mw was found to be equal to 1,53,000; and the number average molecular weight Mn was found to be equal to 53,000).

Example 5 Provides an Electrically Responsive Ink Composition and a Method for Preparing the Same To a 20 milliliters (ml) vial was added 1.5 g of a 20 weight percent solution of the PMMA-PEG copolymer prepared in Example 4 in Dowanol PM, 0.892 g of a 2 M solution of anhydrous lithium perchlorate (LiClO$_4$, Aldrich, CAS 7791-03-9) in Dowanol PM, 1.1 g of a 4 weight percent solution of bromocresol green sodium salt (BCG-Na, Aldrich, CAS 62625-32-5) in Dowanol PM, 0.455 g of a 10 weight percent solution of biphenol (BP, Aldrich, CAS 92-88-6) in Dowanol PM, and 0.369 g of a solution of dicyclohexylamine (DCHA, Aldrich, 101-83-7) in Dowanol PM and the resultant mixture stirred. The relative weight percent of the different components in the resultant ink composition and in the resultant coating composition are included in Table 1 below.

TABLE 1

| Component | Amount added (mmoles) | Ink composition (Weight Percent) | Coating composition (Weight Percent) |
|---|---|---|---|
| Dowanol PM | — | 86.9 | 0 |
| PMMA-PEG | — | 7.0 | 52.9 |
| BCG-Na | 0.050 | 1.0 | 7.8 |
| LiClO$_4$ | 1.15 | 3.9 | 29.4 |
| DCHA | 0.065 | 0.3 | 2 |
| Biphenol | 0.20 | 1.1 | 8 |

Example 6 Provides an Electrically Responsive Coating Composition and a Method for Preparing the Same A coating composition was prepared from the electrically responsive ink composition of Example 5 by spin coating (2000 RPM, 20 sec) a drop of the ink composition over the electrodes on the surface of a DVD-9. The surface of the DVD-9 included a pair of electrodes (20 nm of titanium, 40 nm of copper, 10 nm of Ti—W, and 30 nm of gold patterned on the surface of the DVD-9). A voltage (40 V) was applied across the electrodes for 60 seconds and a change in the percent reflectivity of the coating composition at 650 nm was recorded using an Ocean Optics instrument as the film changed from blue to yellow. The change in the percent reflectivity was from about 37 percent to about 95 percent.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include some of the described embodiments. Accordingly, the invention is not to be seen as limited by the foregoing description, but is only limited by the scope of the appended claims.

The invention claimed is:

1. An electrically responsive ink composition comprising:
   at least one electrically responsive optical-state change material,
   at least one electrolyte material,
   at least one electrically responsive pH modifier,
   at least one solvent, and
   at least one ion-conducting polymeric binder material;
   wherein said ion-conducting polymeric binder material comprises a polymer and an ionic salt;
   wherein said ink composition has a viscosity between about 0.1 centipoise and about 10,000 centipoise, and a maximum optical absorbance in a range from about 200 nanometers to about 800 nanometers; and wherein said ink composition is capable of transforming from a first optical state to a second optical state upon exposure to an electrical stimulus.

2. The composition of claim 1, further comprising a plasticizer.

3. The composition of claim 1, wherein the electrically responsive optical-state change material comprises at least one dye.

4. The composition of claim 1, wherein the electrolyte material comprises at least one ionic material.

5. The composition of claim 1, wherein the electrically responsive pH modifier comprises an aromatic hydroxyl material.

6. The composition of claim 1, wherein the solvent is selected from the group consisting of a glycol ether solvent, an aromatic hydrocarbon solvent containing at least 7 carbon atoms, an aliphatic hydrocarbon solvent containing at least 6 carbon atoms, a halogenated solvent, an amine based solvent, an amide based solvent, a oxygenated hydrocarbon solvent, and a miscible combination thereof.

7. The composition of claim 1, wherein the polymer comprising the binder material is selected from the group consisting of a polymer, an oligomer, a polymeric precursor, and a polymerizable monomer.

8. The composition of claim 1, wherein the polymer comprising the binder material is selected from the group consisting of a polyethylene oxide, a polyolefin, a polyester, a polyamide, a polyacrylate, a polymethacrylate, a polyvinylchloride, a polycarbonate, a polysulfone, a polysiloxane, a polyetherimide, a polyetherketone, and a copolymer thereof.

9. The composition of claim 8, wherein the copolymer is one member selected from the group consisting of a block copolymer, a random copolymer, or a graft copolymer.

10. The composition of claim 9, wherein the copolymer is a polyacrylatepolyethylene glycol copolymer.

11. The composition of claim 1, wherein the transformation from the first optical state to the second optical state is a bistable transformation.

12. The composition of claim 1, wherein the electrically responsive ink
   composition is transformed from the first optical state to the second optical state when subjected to a voltage difference of 0.1 Volts to about 50 Volts across the composition.

13. The composition of claim 1, wherein the difference in optical absorbance between the first optical state and the second optical state of the electrically responsive ink composition is at least 0.1.

14. The composition of claim 1, further comprising a pH modifier.

15. The composition of claim 1, further comprising an anti-photobleaching agent.

* * * * *